United States Patent
Arbon (10) Patent No.: US 10,863,324 B2
(45) Date of Patent: Dec. 8, 2020

(54) MOBILE CONTENT DELIVERY OPTIMIZATION

(71) Applicant: OATH INC., Dulles, VA (US)

(72) Inventor: Zach Arbon, San Francisco, CA (US)

(73) Assignee: Oath Inc., New York, NY (US)

( * ) Notice: Subject to any disclaimer, the term of this patent is extended or adjusted under 35 U.S.C. 154(b) by 308 days.

(21) Appl. No.: 15/184,472

(22) Filed: Jun. 16, 2016

(65) Prior Publication Data
US 2017/0366950 A1    Dec. 21, 2017

(51) Int. Cl.
G06F 3/048     (2013.01)
H04W 4/18     (2009.01)
H04L 29/08    (2006.01)
H04W 4/60     (2018.01)

(52) U.S. Cl.
CPC .............. *H04W 4/18* (2013.01); *H04L 67/025* (2013.01); *H04L 67/06* (2013.01); *H04L 67/20* (2013.01); *H04W 4/60* (2018.02)

(58) Field of Classification Search
CPC .......... H04W 4/18; H04W 4/60; H04L 67/42; H04L 67/2842; H04L 67/18; H04L 67/025; H04L 67/20; H04L 67/22; H04L 67/06; G06F 3/0481; G06F 3/0482; G06F 11/3438; G06F 16/9035; G06F 16/9574
See application file for complete search history.

(56) References Cited

U.S. PATENT DOCUMENTS

| | | | | |
|---|---|---|---|---|
| 9,785,428 | B2 * | 10/2017 | Liang | G06F 8/65 |
| 2004/0034802 | A1 * | 2/2004 | Hamilton | G06F 1/3203 |
| | | | | 713/300 |
| 2010/0094703 | A1 * | 4/2010 | Bramley | G06Q 30/02 |
| | | | | 705/14.45 |
| 2011/0078726 | A1 * | 3/2011 | Rosenberg | G06Q 30/02 |
| | | | | 725/34 |
| 2012/0054057 | A1 * | 3/2012 | O'Connell | G06F 21/36 |
| | | | | 705/26.1 |
| 2015/0241941 | A1 * | 8/2015 | Luna | G06F 16/9574 |
| | | | | 713/320 |
| 2016/0350135 | A1 * | 12/2016 | Novitchenko | H04L 67/22 |
| 2017/0262891 | A1 * | 9/2017 | Green | G06Q 30/0267 |

* cited by examiner

Primary Examiner — Phuong H Nguyen
(74) Attorney, Agent, or Firm — Cooper Legal Group, LLC (57) ABSTRACT

Systems and methods provide for optimizing content delivery in mobile applications. A mobile application executing on a mobile computing device can obtain application interaction data that corresponds to user inputs and sensor data detected by the mobile computing device during execution times of the mobile application. The mobile computing device can send the interaction data to a remote server device that is configured to analyze the data and determine one or more optimal content display factors that are based on identified usage characteristics of the mobile application. The remote server device can then send the determined optimal content display factors back to the mobile computing device, where the timing, sizing, positioning, orientation, and other configurations of third-party content displays are influenced based on this information.

20 Claims, 4 Drawing Sheets

MOBILE CONTENT DELIVERY OPTIMIZATION

BACKGROUND

Mobile computing devices are employed by users to regularly conduct a variety of both personal and enterprise-related tasks. A large variety of mobile applications that enable the performance of such tasks can be made available for download via application repositories or "app stores." There can be many, if not hundreds, of different applications directed to performing one particular task. Within the many, only a small percentage of applications become popular and adopted by a large population of users. There are a variety of factors that users may consider when testing out an application before it becomes a "keeper." Ease of use, functionality, interoperability, and cost are just a few of many factors considered by users when testing out a new mobile application. Not surprisingly, cost is one of the most significant factors considered by users before downloading and/or purchasing a new application for use.

Developers have subsidized the costs of developing free or reduced-cost applications by incorporating, into their application code, code that is based on third-party-content software development kits (SDKs). In other words, developers are programmatically allowing third-party content providers to display third-party content within their applications, so they can generate revenue while offering their applications for free or at reduced cost. These developers have found, however, that the inclusion of third-party content on application graphical user interfaces actually have the tendency to turn users away. Users oftentimes remove an application from consideration when they notice unappealing third-party content consuming valuable screen real estate and taking away from the user experience. It would be beneficial, however, to improve user conversion rates to an application by strategically delivering the revenue-generating content to users without degrading the user experience.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described herein relate to, among other things, optimizing content delivery within mobile applications. In essence, embodiments are broadly directed to analyzing application-user interaction data and providing for display, within the application, third-party content at a determined time and configuration that is based at least in part on the analyzed interaction data. In other words, interaction data corresponding to inputs or sensor data detected by a mobile application can be obtained and analyzed to determine application usage data and user preferences. In this way, the mobile application and/or the underlying SDKs can employ the determined usage data and user preferences to provide an improved user experience by displaying third-party content in a less invasive and more appropriately-timed and/or more appropriately-configured manner.

At a high level, application interaction data (e.g., detected user inputs and/or sensor data) is obtained from a mobile computing device while an application is executing. The interaction data is obtained by the application as the interaction data is detected by the mobile computing device. Interaction data can include, among other things, the positions of detected user inputs corresponding to the application and/or displayed third-party content, screen orientations during application operation, duration of application operation, times of application operation, and/or frequency of application operation.

The obtained application interaction data can be processed locally, or sent to a remote server device to be processed. The obtained application interaction data is processed to determine optimal content display factors that are based at least in part on the obtained application interaction data. In some instances, the optimal content display factors can include, among other things, a time, duration, size, position, and/or orientation to provide for display a piece of third-party content that is customized in accordance with the obtained interaction data. The optimal content display factors can also include a location, genre, or category specific to one or more pieces of third-party content. In some other instances, the third-party content identifier can indicate a third-party content identifier that corresponds to a particular piece of third-party content.

After the optimal content display factors are determined, the application employs the optimal content display factors, or at least a portion thereof, to provide for display a selected piece of third-party content within a user interface of the application. The piece of third-party content can be selected and/or manipulated for presentation in a display configuration that is based at least in part on the determined optimal content display factors.

In some embodiments, the piece of third-party content can be selected from a locally-stored collection of content that was obtained from a remote server device. In even further embodiments, the obtained collection of content can be customized for the mobile computing device, by the remote server device, based at least in part on the determined optimal content display factors.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Users of mobile computing devices oftentimes try out new mobile applications to perform various tasks. A majority of such mobile applications are made available to users in a free or trial version that displays revenue-generating third-party content. The inclusion of revenue-generating third-party content in a free or trial version of an application can generally help a developer offset the costs associated with providing the application for free. In many instances, developers hope that users will utilize the application enough to pay for an "unobstructed" version that removes all instances of the revenue-generating third-party content. In this way, a developer can widely distribute an application with hopes that users will give it a try, take a liking to it, and eventually purchase it.

The display of revenue-generating third-party content on the face of a mobile application can take away from the user experience. Oftentimes, this reason alone is enough for some users to justify the removal of an application without giving it a fair evaluation. In some situations, a bottleneck in computing resources (e.g., processing power and bandwidth) created by mobile applications displaying revenue-generating third-party content can also negatively impact the user experience. To this end, embodiments described herein are directed to optimizing content delivery within mobile applications.

Ideally, a developer would implement a feature that delays the display of revenue-generating third-party content. The application would be provided as a non-obstructed version on a time trial basis. That is, after the expiration of a predefined duration based on application usage or time from installation, the application can transition from an unobstructed application to displaying the revenue-generating third-party content. Mobile applications generally include portions of code that are based on third-party content software development kits (SDKs) that facilitate the retrieval (e.g., from remote servers) and display of third-party content upon an execution of the application and/or a detected connection to a network, among other scenarios. The developers who include code based on these third-party content SDKs are generally at the mercy of the SDK provider. The process related to the retrieval and display of third-party content is relatively static. That is, the graphical user interface (GUI) of a mobile application includes a code portion that references the third-party content SDK, and that retrieval and display of the third-party content is generally fixed in position and orientation on the application's GUI.

In some situations, a bottleneck in computing resources (e.g., processing power and bandwidth) created by mobile applications displaying revenue-generating third-party content can also negatively impact the user experience. In more detail, mobile applications generally include portions of code based on third-party content SDKs that facilitate the retrieval (e.g., from remote servers) and display of third-party content upon execution of the application or detected connectivity to a network, among other scenarios. In this regard, multiple applications or processes may be simultaneously initialized (e.g., started, resumed, or executed) after a system halt or other re-initialization of running processes, thereby slowing down the system and negatively impacting the user experience. In another instance, when network connectivity becomes available, a plurality of applications may make synchronous calls to retrieve and/or display the third-party content, also undesirably slowing down the system.

As such, in some embodiments, application interaction data based on one or more detected inputs corresponding to an application executing on a mobile computing device can be obtained by the mobile computing device or components thereof. In essence, input events for an application and detected by the mobile computing device can be recorded and stored in memory. The obtained application interaction data can then processed locally, or sent to a remote server device for processing, to determine optimal content display factors for the mobile computing device based at least in part on the application interaction data. The determined optimal content display factors can then be employed by the mobile computing device.

The optimal content display factors can include, among other things, a time, duration, size, and/or orientation to provide for display a piece of third-party content. The mobile computing device or components thereof can provide for display the piece of content within a user interface of the application. The piece of content can be provided for display in accordance with, among other things, a portion of the received optimal content display factors. To this end, in some aspects, third party content can be selected and/or displayed after the user has had a predetermined amount of unobstructed or uninterrupted time to test the application. In other words, no third-party content will be provided for display until a determination is made that the application has been executing beyond a threshold period of time. In other aspects, third party content can be automatically selected and/or displayed in customized positions, sizes, orientations, and other configurations that are better suited for a particular mobile computing device and its associated user.

In further embodiments, a collection of third-party content displayable within one or more mobile applications of a mobile computing device can be obtained from a remote server device, independent of the one or more mobile applications, and stored on the mobile computing device. For instance, a background service can discreetly retrieve a collection of third-party content for local storage. In some further embodiments, the collection can be retrieved in the background, during known down times, and/or with less frequency than traditional methods. Individual pieces of the collection can be made available to the one or more mobile applications. In this way, third-party content retrieval can be conducted independent from the mobile application, thereby mitigating situations where multiple applications or processes performing such operations undesirably slow down the system.

Figure 1:
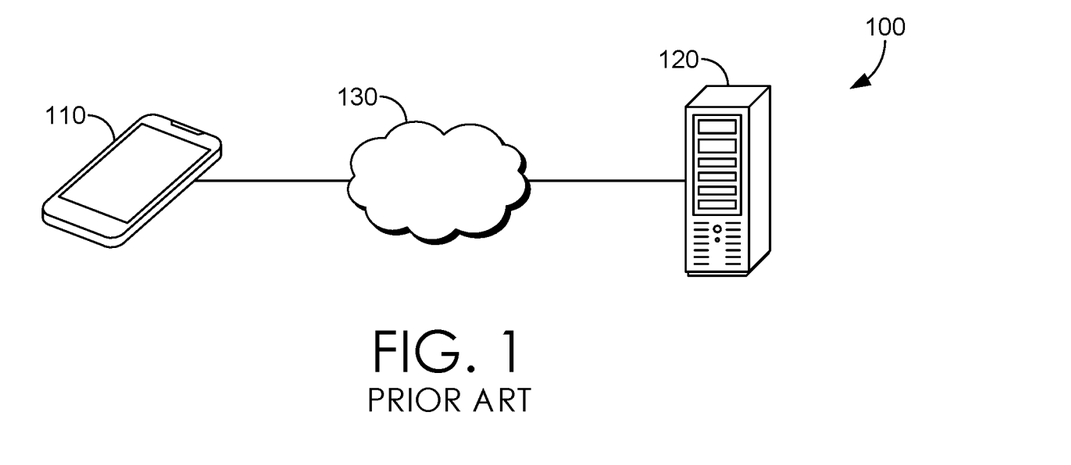
FIG. 1 is a block diagram illustrating an exemplary system of the prior art.

With brief reference to FIG. 1, a block diagram is provided illustrating an exemplary system 100 of the prior art for providing third-party content within mobile applications. The system 100 is an example of a suitable architecture for implementing certain aspects of the prior art. Among other components not shown, the system 100 includes, at a high level, a mobile computing device 110 (e.g., a mobile phone, tablet, laptop, GPS, wearable, etc.) having at least one application configured to be executed thereon. The mobile computing device 110 can retrieve, via the application executing thereon, a piece of third-party content from remote server device 120 for display on a GUI of the executing application. More specifically, the mobile computing device 110 can request, retrieve, and display a piece of third-party content upon the execution of a mobile application or upon detection of network connectivity by the executing application. The mobile computing device 110 and remote server device 120 are in communication via a network 120, which may include, without limitation, one or more local area networks (LANs) and/or wide area networks (WANs), such as the Internet. The remote server device 120 is typically a third-party content server (e.g., an ad server) configured to provide a piece of third-party content to remote computing devices, such as mobile computing device 110, in response to a request received therefrom.

Figure 2:
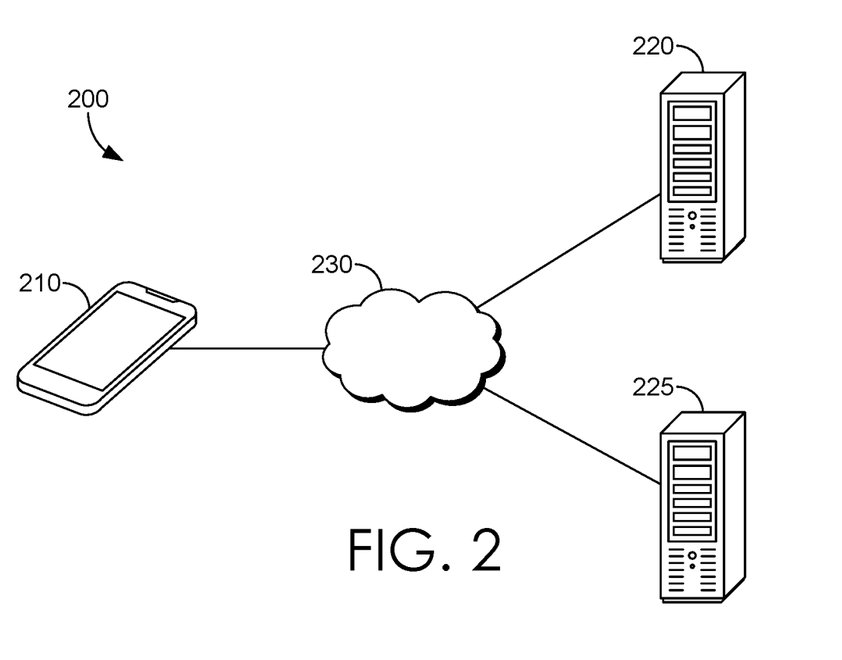
FIG. 2 is a block diagram illustrating an exemplary system in accordance with some implementations of the present disclosure.

Turning now to FIG. 2, a block diagram is provided, illustrating an exemplary system 200 for optimizing content delivery within mobile applications in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 is an example of a suitable architecture for implementing certain aspects of the present disclosure. It should be understood that any number of user devices and servers may be employed within the system 200 within the scope of the present disclosure. Each of the servers and client devices shown in FIG. 2 may be implemented via a computing device, such as computing device 1100, later described with reference to FIG. 11, for example. The components may communicate with each other via network 230. Each may comprise a single device or multiple devices cooperating in a distributed environment. Additionally, other components not shown may also be included within the system 200.

Among other components not shown, the system 200 includes, at a high level, a mobile computing device 210 (e.g., a mobile phone, tablet, laptop, GPS, wearable, etc.) having at least one mobile application configured to be executed thereon. In some embodiments, the mobile computing device 210 can obtain a collection of third-party content from a server device, such as remote server device 220. In further embodiments, a generated collection can be obtained from remote server device 220 at unobtrusive times (e.g., times of inactivity) and stored in a memory (not shown) of the mobile computing device 210. In even further embodiments, the collection can be generated locally on the mobile computing device 210 as pieces of third-party content are individually obtained by the mobile computing device 210 from the remote server device 220, independent from any third-party content displaying application.

In some embodiments, a piece of third-party content can be selected from the locally stored collection of third-party content for display on a GUI of the executing application. More specifically, the mobile computing device 210 can select and display a piece of third-party content at an optimized time, position, and/or orientation on a GUI of the executing application to improve the user experience. In this way, obtrusive third-party content may not appear upon the initial execution of the application in accordance with some embodiments.

In further embodiments, the mobile computing device 210 can obtain application interaction information that corresponds to one or more applications executing thereon. That is, user inputs corresponding to an application executing on the mobile computing device 210 can be monitored, so that the user inputs are logged and, in some instances, stored in a memory or cache of the mobile computing device 210. In embodiments, the user inputs can include, among other things, touchscreen inputs, inputs from coupled input devices, device orientation data (e.g., accelerometer data, gyroscope data, magnetometer data, etc.), and locational data (e.g., GPS data, compass data, etc.), among other input data sensed or detected by the mobile computing device 210 as one or more applications is executing thereon.

The logged application interaction information can be sent from the mobile computing device 210 to a remote server device configured to analyze the obtained application interaction information and determine, by way of the analysis, optimal content display factors for the mobile computing device 210. In some embodiments, the remote server device can be remote server device 220 configured to both provide the collection of third-party content to the mobile computing device 210 and determine optimal content display factors for the mobile computing device 210. In other embodiments, the remote server device can be another remote server device, such as remote server device 225, configured to receive the obtained application interaction information from the mobile computing device 210 and determine the optimal content display factors therefor. It is contemplated that the third-party content SDK, on which the application is built, can be responsible for at least obtaining the application interaction information, sending the obtained application interaction information to remote server device 220 or 225 for analysis, and obtaining the determined optimal content display factors from the remote server device 220 or 225 so that the application executing on the mobile computing device 210 can provide for display a piece of third-party content in a manner that is less obtrusive and optimizes the user experience.

The mobile computing device 210 and remote server device 220, 225 are in communication via a network 220, which may include, without limitation, one or more local area networks (LANs) and/or wide area networks (WANs), such as the Internet. The remote server device 220 can be a third-party content server (e.g., an ad server) configured to provide at least one piece or collection of third-party content to remote computing devices, such as mobile computing device 210, in response to a request received therefrom. In accordance with embodiments described herein, third-party content can include an advertisement, a survey, a product price promotion, a product description, a time-limited offer, subscription content, and the like. The remote server device 225 can be a server configured to determine optimal content display factors for any mobile computing device from which it can receive application interaction information from. As was noted above, the remote server device 220 and 225 can be one remote server device or a plurality of remote server devices configured in a distributed environment.

Figure 3:
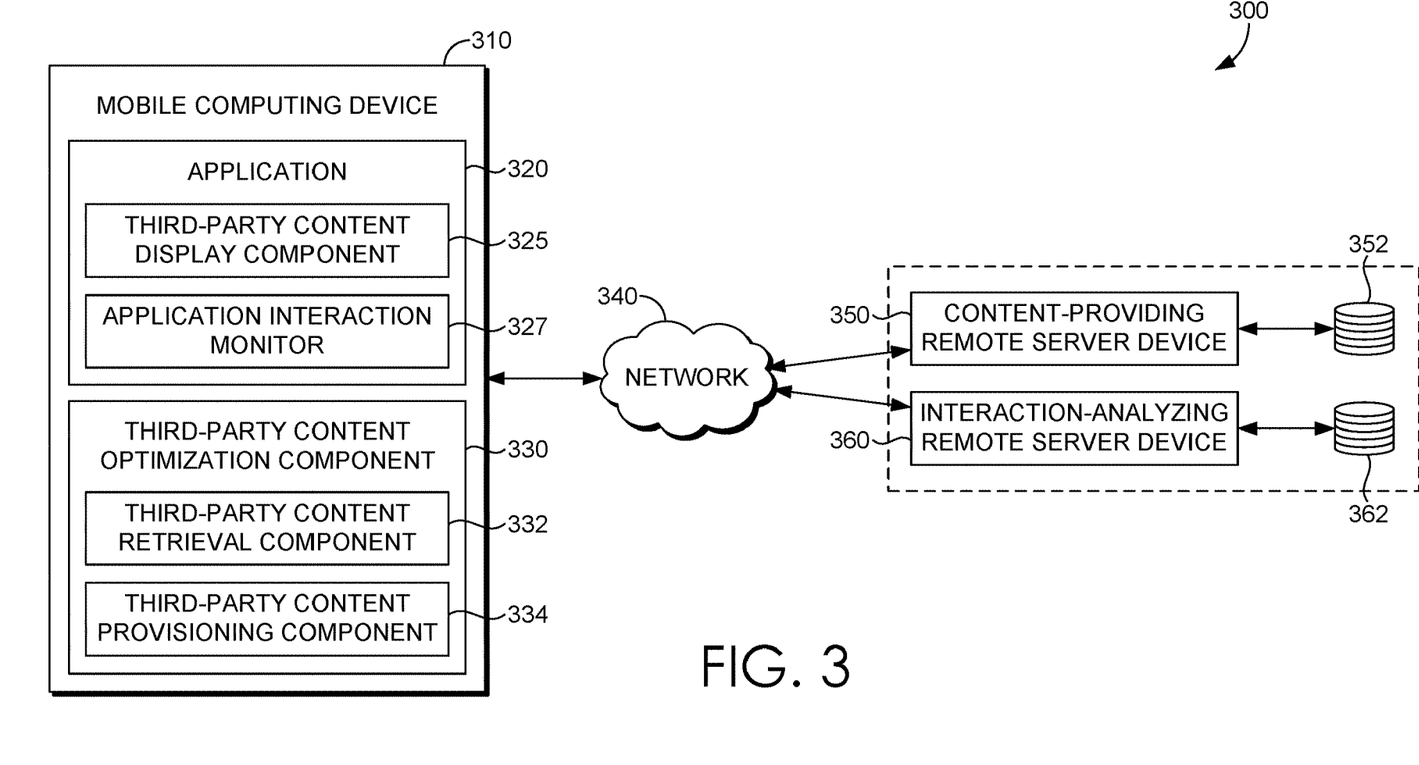
FIG. 3 is a block diagram illustrating an exemplary component framework of the system in accordance with some implementations of the present disclosure.

With reference now to FIG. 3, a block diagram illustrating an exemplary component framework 300 of the system in accordance with some implementations of the present disclosure is provided. The mobile computing device 210 of FIG. 2 is represented in FIG. 3 as mobile computing device 310 comprising, among other things, an application 320 configured to provide for display third-party content. The application 320 can include a third-party content display component 325 for determining when and how to provide, for display, third-party content on a GUI of the application 320. The application 320 can also include an application interaction monitor 327 for obtaining application interaction information that is based on user inputs detected by the mobile computing device 310 while the application 320 is executed.

In some embodiments, the mobile computing device 310 further comprises a third-party content optimization component 330 configured to optimize the obtaining and provisioning of third-party content to the application 320. In embodiments, the third-party content optimization component 330 can include a third-party content retrieval component 332 for obtaining the third-party content from a remote server device over a network 340, and a third-party content provisioning component 334 for providing at least a portion of the third-party content to application 320 in response to a request.

In accordance with embodiments described herein, the application 320 can be an executable mobile application that is configured to obtain one or more pieces of third-party content that can be provided for display in an optimized configuration that is based at least in part on determined optimal content display factors. The application 320 can be any preinstalled or downloaded application that can be executed on the mobile computing device 310.

Storing Third-Party Content Locally for Subsequent Provisioning

In some embodiments, the application 320 can obtain the piece of third-party content by retrieving it from a collection of third-party content stored in a memory of the mobile computing device 310. For instance, a plurality of pieces of third-party content can be stored in memory as a collection, which can be apportioned by individual pieces to one or more applications configured to retrieve pieces of third-party content therefrom. In some embodiments, the collection can be sorted by categories or can include metadata that facilitates a selection of certain pieces of third-party content based on user location, application usage, time and/or date, and other factors. While embodiments described herein illustrate configurations where the application 320 is configured to obtain third-party content stored locally on the mobile computing device 310, it is contemplated that in some other embodiments, the application 320 can bypass the third-party content retrieval component 332 to obtain third-party content by retrieving pieces directly from a remote server device, such as content-providing remote server device 350.

The collection of third-party content displayable within the application 320 can be obtained from a remote server device and stored on the mobile computing device via a third-party content retrieval component 332 resident on the mobile computing device. In embodiments, the third-party content retrieval component 332 is configured to execute independent of the application 320. For example, the third-party content retrieval component 332 can be an application or service that runs in the background, and can be configured to retrieve a collection of third-party content from a third-party content server (e.g., content-providing remote server device 350) for local storage. The third-party content retrieval operations performed by the third-party content retrieval component 332 are executed independently from the application 320. In fact, in some embodiments, the application 320 may be configured only to retrieve third-party content when the application 320, or any foreground application for that matter, is not running.

In some further embodiments, the collection can be retrieved by the third-party content retrieval component 332 from the content-providing remote server device 350 in the background (e.g., as a daemon), during known mobile computing device 310 down times (e.g., typical user sleep times, while charging, while no physical movements are detected, etc.), at predetermined or dynamic intervals, and/or with less frequency than traditional methods. Individual pieces of the collection can be made available to the application 320 via a third-party content provisioning component 334 that is resident on the mobile computing device 310. In this way, third-party content retrieval can be conducted independent from the mobile application executing on the mobile computing device 310, thereby mitigating situations where multiple applications or processes performing such operations may undesirably slow down the system.

Responding to Requests for Locally-Stored Third-Party Content

The third-party content provisioning component 334 can receive requests for one or more pieces of third-party content from application 320 executing on the mobile computing device. The request can be generated by the application 320 as a result of the application 320 including code associated with a third-party content SDK in accordance with the present disclosure. Instead of sending a network request for third-party content to a third-party content server, as performed in traditional systems, the application 320 can include executable instructions or code that, when executed by a processor, can generate a request for third-party content to a locally-executing third-party content provisioning component 334. The third-party content provisioning component 334 can select one or more pieces of third-party content based on a number of pieces requested in the received request.

In some embodiments, the third-party content provisioning component 334 can select one or more pieces of third party content utilizing information received by a remote server device that is configured to determine optimal content display factors for any mobile computing device from which it can receive application interaction information from. Here, interaction-analyzing remote server device 360 can be a server configured for analyzing application interaction information received from the application 320 executing on mobile computing device 310. In accordance with embodiments described herein, application interaction information can include information related to user inputs corresponding to the application 320 executing on the mobile computing device 210.

Monitoring Application Interaction for Analysis

As described hereinabove, the executing application 320 can be monitored such that its corresponding interactions from a user are logged and, in some instances, stored in a memory or cache of the mobile computing device 310. In some embodiments, the application 320 can include an application interaction monitor 327 that can monitor, among other things, when the application 320 is being executed, where the application 320 is being executed, how the application 320 is being utilized, and the detected user inputs/interactions corresponding to a running instance of the application 320. The application interaction monitor 327 can store or log application interaction data, including information corresponding to application 320 start and stop times and dates, touchscreen inputs, inputs from coupled input devices, position and duration of inputs, general device orientation data (e.g., accelerometer data, gyroscope data, magnetometer data, etc.), specific device orientation data (e.g., device orientation when a user input is detected), and/or locational data (e.g., GPS data, compass data, etc.), among other data sensed or detected by the mobile computing device 310 while the application 320 is executing. In essence, all interaction data between the user and the executing application 320 can be logged, such that an analysis thereof can provide optimal times and configurations for displaying third-party content to the user of the mobile computing device 310.

The application interaction monitor 327 can be implemented by including code associated with the third-party content SDK into at least some portions of the application 320 code. In some embodiments, the code for monitoring the detected user inputs is included in the GUI components of the application 320 code. However, it is contemplated that in some configurations, a simple programmatic reference to implement features of the SDK can facilitate the monitoring of any or all user inputs corresponding to the application 320 executing on the mobile computing device 310. In this regard, the application interaction monitor 327 can detect user input events that are typically thrown as a result of detected user inputs, and caught by methods in the application 320 code to perform some sort of function. It is also contemplated that the application interaction monitor 327 can detect user input events that aren't necessarily programmed to be detected by methods of the application 320 code to perform predefined functions. In this regard, additional user inputs unrelated to the application (e.g., device movements, location, angles at which the device is held, etc.) can also be logged by the application interaction monitor 327 for subsequent analysis.

Remote Server Device(s) for Providing Third-Party Content and Analyzing Application Interaction Data Although described here as separate server devices, it is contemplated that interaction-analyzing remote server device 360 and content-providing remote server device 350 can be the same device or configured in a distributed environment, as indicated by dotted line 345. The functionality of each remote server device 350, 360 is described utilizing different server devices merely to simplify the provided disclosure.

The content-providing remote server device 350 can be any computing device configured to provide one or more pieces of third-party content to a requesting computing device, such as mobile computing device 310. In some embodiments, the content-providing remote server device 350 can be in communication with a third-party content data store 352 that includes a plurality of pieces of third-party content to be served to consumers via their personal computing devices. In embodiments, the content-providing remote server device 350 can be coupled with the data store 352 configured to store the plurality of pieces of third-party content. In some embodiments, the data store 352 can identify particular pieces of third-party content based on associated identifiers, genres, categories, or other forms of associated metadata that can uniquely identify one or more pieces of third-party content.

In some embodiments, the content-providing remote server device 350 can respond to requests to receive third-party content in the form of individual pieces. That is, for each request, a single piece of third-party content is provided to the requesting entity in response to the request. In further embodiments, the content-providing remote server device 350 can respond to requests to receive third-party content in the form of a collection. In this regard, for each request, a single collection of third-party content is provided to the requesting entity in response to the request. In even further embodiments, the content-providing remote server device 350 can respond to either type of request accordingly, based on the type (e.g., requesting a piece or a collection of third-party data) of request received.

The interaction-analyzing remote server device 360 can be any computing device configured to receive application interaction data obtained by a mobile computing device (e.g., mobile computing device 310) and process the received application interaction data by analyzing it to determine optimal content display factors for the mobile computing device from which the application interaction data was received. In other words, the interaction-analyzing remote server device 360 can receive user interaction data detected and logged by the application interaction monitor 327 to determine information that can be helpful to optimize the user's experience with the application 320, and in some instances, optimize the configuration of third-party content for optimizing user interaction therewith. In some embodiments, these determined "optimal content display factors" can be communicated to the mobile computing device 310 and employed by the third-party content display component 325 to determine when and how to provide for display the third-party content.

In embodiments, the interaction-analyzing remote server device 360 can be coupled with another data store 362 configured to store the received user interaction data from a plurality of mobile computing devices. In some embodiments, the interaction-analyzing remote server device 360 or its data store 362 can designate a unique identifier or profile for each mobile computing device and/or applications thereof so that user interaction data received therefrom can be referenced back to the corresponding device and/or application. In some embodiments, the unique identifier can be based on one or more identifying characteristics of the received user interaction data, which may include, among other things, a username, a phone number, an email address, a device identifier or IMEI, a device serial number, or any combination thereof.

Optimized Display of Third-Party Content

The third-party content display component 325 can be configured to receive one or more optimal content display factors from the interaction-analyzing remote server device 360. In some embodiments, the third-party content display component 325 can request the optimal content display factors from the interaction-analyzing remote server device 360, and the interaction-analyzing remote server device 360 can send the optimal content display factors determined thereon to the third-party content display component 325 of mobile computing device 310 in response to the request. In some other embodiments, the interaction-analyzing remote server device 360 can push the determined optimal content display factors to the third-party content display component 325 of mobile computing device 325. The determined optimal content display factors can be pushed to the mobile computing device 310 at predefined intervals, when analysis of received application interaction data is completed, and/or every time the determined optimal content display factors change based on received application interaction data.

After receiving the optimized content display factors, the third-party content display component 325 can determine when and how to provide one or more pieces of third-party content for display via the application 320.

By way of example only, an analysis of the application interaction data corresponding to the application 320 can indicate a total amount of time that the application 320 has been executing (e.g., starting after initial execution) on the mobile computing device 310. In this regard, a threshold duration may be preconfigured (e.g., preset by a developer of the application 320 or a managing entity of the third-party content SDK) such that the third-party content display component 325 does not provide any third-party content for display until a determination is made that the threshold duration has been met and/or exceeded. In some embodiments, the determination is made by the third-party content display component 325 utilizing the optimized content display factors, which may include an elapsed time of use to compare to the threshold duration defined within the application 320 code.

In some other embodiments, the determination can be made by the interaction analyzing remote server device 360 to determine an optimal date and/or time to begin providing third-party content for display based on received interaction information. Such determinations made on the interaction-analyzing remote server device 360 can be sent to the mobile computing device 310 in the form of optimal content display factors in accordance with embodiments described herein. In this way, the optimized content display factors utilized by the third-party content display component 325 may enable a user of the mobile computing device 310 to experience an unobstructed version of the application, which may consequentially increase user conversion rates for regularly utilizing the application.

In another example, an analysis of the application interaction data corresponding to the application 320 can determine a likelihood that a user of the mobile computing device 310 is right or left handed, or in some instances that the user prefers landscape orientations or portrait orientations, based on recorded angles, orientations, placement of detected user inputs on the touchscreen of the mobile computing device 310, or any combination including at least one of the foregoing interaction characteristics logged by the application interaction monitor 327. In this regard, the interaction-analyzing remote server device 360 can determine a preferred size and/or screen location at which to provide for display a piece of third party content. This determination can be sent in the form of an optimal content display factor and sent to the mobile computing device 310. In this way, in accordance with some embodiments, the third-party content display component 325 can request (for instance, from third-party content provisioning component 334) a particular configuration (e.g., size or orientation) of third-party content, so that the third-party content display component 325 can provide the optimally configured piece of third-party content in a configuration that is based on the optimal content display factors.

In another example, an analysis of the application interaction data corresponding to the application 320 can indicate a particular location that the application 320 has been executing on the mobile computing device 310. In this regard, the interaction-analyzing remote server device 360 can generate optimal content display factors that indicate particular pieces, genres, and/or categories of third-party content that may be relevant to the location(s) at which the application 320 is typically executed. The third-party content display component 325 can utilize this information to request (for instance, from third-party content provisioning component 334) one or more pieces of third-party content based on an identifier, genre, location, category, and the like. In this way, a user of the mobile computing device 310 is presented with third-party content that may be relevant to the user's location at the time of execution.

In another example, an analysis of the application interaction data corresponding to the application 320 can indicate particular times, days, seasons, and other temporal indicators describing when the application 320 has been executing on the mobile computing device 310. As such, the interaction-analyzing remote server device 360 can generate optimal content display factors that indicate particular pieces, genres, and/or categories of third-party content that may be relevant to the time(s) and/or date(s) at which the application 320 is typically executed. The third-party content display component 325 can utilize this information to request (for instance, from third-party content provisioning component 334) one or more pieces of third-party content based on an identifier, genre, category, time of day, day of week, season, holiday, and the like. In this way, a user of the mobile computing device 310 is presented with third-party content that may be relevant to the time of application 320 execution.

The foregoing examples are intended to be non-limiting and merely a few examples of many potential embodiments covered by embodiments described herein. It is contemplated that any combination of pieces of application interaction information analyzed by the interaction-analyzing remote server device 360 can generate optimal content display factors that can optimize either or both the user's experience with an application configured to display third-party content, or the third-party content provider's exposure and rates of user interaction with third-party content displayed via an application.

Methods for Optimizing Content Retrieval and Delivery in Mobile Applications

Figure 4:
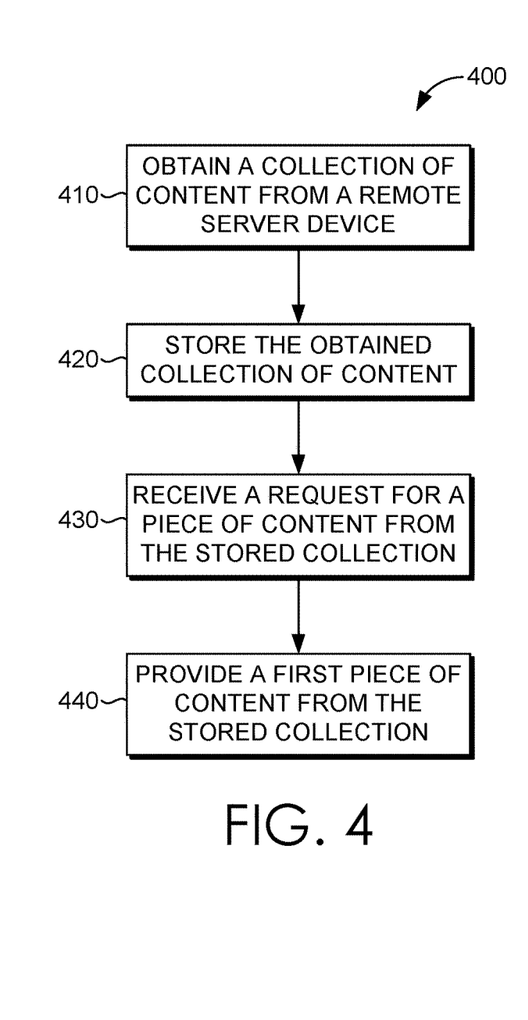
FIG. 4 is a flow diagram showing methods for optimizing content retrieval and delivery in mobile applications in accordance with implementations of the present disclosure.

Having described various aspects of the present disclosure, exemplary methods are described below for optimizing content delivery in mobile applications. Referring to FIG. 4 in light of FIGS. 1-3, FIG. 4 is a flow diagram showing a method 400 for optimizing content retrieval and delivery in mobile applications. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, a third-party content servicing application (for instance, third-party content optimization component 330 of FIG. 3) obtains a collection of content from a remote server device. The collection of content can be obtained in a background process associated with the third-party content servicing application. The background process can be configured to obtain the collection piece by piece or in its entirety. The background process can also be configured to execute at determined downtimes (e.g., when the mobile computing device is charging and/or not detecting movement, or during known non-peak timeframes). The collection of content can include a plurality of pieces of third-party content that are each displayable within one or more mobile applications of the mobile computing device. In some embodiments, the remote server device can be an advertisement server configured to provide one or more pieces of third-party content in response to a request received from the third-party content servicing application. In further embodiments, the remote server device can also provide a collection of third-party content in response to a request for the collection from the third-party content servicing application. The servicing application can be configured to obtain and store the collection of third-party content from the remote server device for purposes of providing one or more pieces of the collection to the mobile application and other applications of the mobile computing device configured to obtain third-party content from the servicing application. In accordance with embodiments described herein, a piece of third-party content can comprise an advertisement, a survey, a product price promotion, a product description, a time-limited offer, subscription content, and the like.

At block 420, the obtained collection of content is stored in a memory of the mobile computing device by the third-party content servicing application. The collection of content can be stored in a memory location or directory that is associated with the third-party content servicing application, and not associated with the one or more mobile applications for which the pieces of third-party content is displayable in.

At block 430, a request for a piece of content from the stored collection is received from the mobile application while it is executing on the mobile computing device. The request can be generated by at least a portion of mobile application code that is based in part on a third-party content SDK. The code can, in essence, generate the request based on optimal content display factors determined by and received from the remote server device and provided to one or more components (e.g., third-party content display component 325 of FIG. 3) of the mobile application. In accordance with embodiments described herein, the remote server device (for instance, interaction-analyzing remote server device 360) can be configured to analyze application interaction data obtained by the application (e.g., via the third-party content SDK) and sent to the remote server device for analysis. The remote server device can analyze the application interaction data to generate, among other things, one or more optimal content display factors that can dictate when and how third-party content is to be provided for display on the mobile computing device via a graphical user interface of the executing mobile application.

At block 440, the executing mobile application is provided with at least a first piece of content from the stored collection of content. The first piece of content can be provided to the mobile application from the third-party content servicing application in response to a request received therefrom. The mobile application or a portion thereof can be configured to generate the request for third-party content based on the received optimal content display factors. In some embodiments, the request can include one or more of a third-party content identifier that identifies a particular piece of third-party content, a genre of third-party content, a category of third-party content, an author of third-party content, or any other identifier (e.g., location, time, date, age, demographic, etc.) that can narrow the collection of third-party content such that a relevant piece of third-party content is provided to the requesting mobile application based on the request.

Methods for Optimizing Content Display Configurations in Mobile Applications

Figure 5:
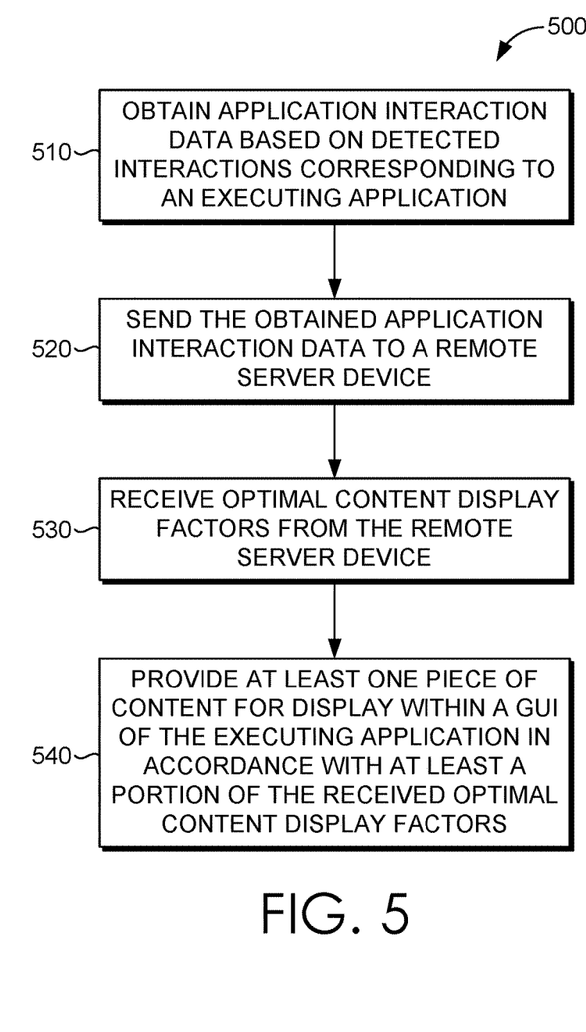
FIG. 5 is a flow diagram showing methods for optimizing content display configurations in mobile applications in accordance with implementations of the present disclosure.

Referring to FIG. 5 in light of FIGS. 1-3, FIG. 5 is a flow diagram showing a method 500 for optimizing content display configurations in mobile applications. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, application interaction data that is based on one or more detected inputs, among other things, and corresponding to a mobile application executing on a mobile computing device is obtained. In accordance with some embodiments, the detected inputs can comprise any one of touchscreen data, accelerometer data, gyroscope data, magnetometer data, proximity sensor data, infrared receiver data, GPS sensor data, and the like. In some further embodiments, the application interaction data can be further based on a duration, frequency, time, day, and/or location of mobile application use.

At block 520, the obtained application interaction data is sent to a remote server device (for instance, interaction-analyzing remote server device 360 of FIG. 3) to determine optimal content display factors for the mobile application of the mobile computing device. The optimal content display factors are determined by the remote server device based on the application interaction data it received from the mobile application executing on the mobile computing device. In accordance with some embodiments described herein, the remote server device can also be configured to provide the mobile computing device with a collection of third-party content in response to a request received therefrom.

At block 530, the optimal content display factors determined by the remote server device are received by the mobile application executing on the mobile computing device. As described herein, the optimal content display factors can dictate when and how pieces of third-party content are to be configured when provided for display on the mobile computing device via the executing mobile application.

At block 540, at least one piece of content within a user interface of the executing mobile application is provided for display in accordance with one or more of the received optimal content display factors.

Methods for Providing Optimized Content Configurations for Mobile Applications

Figure 6:
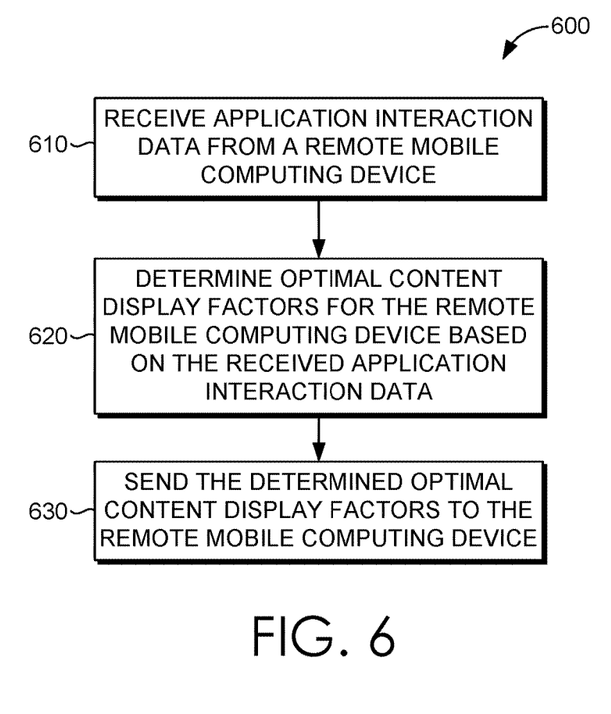
FIG. 6 is a flow diagram showing methods for providing optimal content display configurations for mobile applications in accordance with implementations of the present disclosure.

Referring to FIG. 6 in light of FIGS. 1-3, FIG. 6 is a flow diagram showing a method 600 for providing optimal content display configurations for mobile applications. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 610, a server device (for instance, interaction-analyzing remote server device 360 of FIG. 3) receives application interaction data from a remotely located mobile computing device (for instance, mobile computing device 310 of FIG. 3). A mobile application executing on the mobile computing device, such as mobile application 320 of FIG. 3, can be configured to monitor and generate a log of detected user inputs and detected data from device sensors on the mobile computing device, while executing, to obtain the corresponding application interaction data. The server device can be configured to receive the application interaction data from the mobile computing device when the mobile computing device and server device are associated to each other via a common third-party content SDK. In essence, the mobile application can comprise code corresponding to the third-party content SDK that can direct communications between the mobile computing device and server device. In some embodiments, the server device can also be configured to send the mobile computing device 310 pieces and/or a collection of third-party content in response to a request received therefrom.

At block 620, the server device determines optimal content display factors for the remote mobile computing device based on the application interaction data received therefrom. In some embodiments, at least a portion of the optimal content display factors can be determined by analyzing the application interaction data to determine correlations therein, which indicate statistically significant usage or interaction characteristics of the mobile application executing on the mobile computing device. Statistically significant usage or interaction characteristics can be determined when a percentage of the characteristics exceed a predetermined probability threshold (e.g., a minimal percentage—51%, 90%). In this way, the optimal content display factors can be utilized to optimize third-party content placement, orientation, selection, sizing, and the like.

By way of example, the application interaction data may indicate that about 90% of the time, the user of the mobile computing device prefers to hold it in a landscape orientation. Also, while holding in landscape mode, about 87% of the detected touch inputs were directed to the right half of the touchscreen display of the mobile computing device. In this regard, the server device may determine that the interaction characteristic of holding the mobile computing device in landscape mode is statistically significant for purposes of selecting a particular size of third-party content for display on the mobile computing device. For instance, a piece of third-party content provided for display in landscape mode may necessitate a longer width and shorter height in comparison to portrait mode.

Further, the server device may determine that the interaction characteristic of touch inputs on the right half of the touchscreen display, only when the mobile computing device is held in landscape mode, may be statistically significant for purposes of positioning the third-party content within the GUI of the mobile application. For instance, if the intention is to provide a less obtrusive experience and prevent unintentional interactions with the third-party content, then a piece of third-party content may be sized and positioned to appear on the left half of the display. On the other hand, if the intention is to increase user interaction with the third-party content, then the piece of third-party content may be sized and positioned to appear on the right half of the display where the user is statistically more likely to interact with the displayed third-party content.

In some further embodiments, some of the optimal content display factors can be determined by aggregating common portions of interaction data to indicate usage history. In this regard, application usage history can be compared to predefined threshold durations before a decision is made (e.g., by the mobile application) to provide third-party content for display on the mobile computing device.

At block 630, the determined optimal content display factors are sent to the remote mobile computing device. The remote mobile computing device can be configured to receive the determined optimal content display factors and further display, in accordance with a least some of them, one or more pieces of third-party content within a GUI of the executing mobile application.

It is contemplated herein that the determined optimal content display factors can also be communicated to other components of the system described herein. For instance, the interaction-analyzing remote server device 360 of FIG. 3 can communicate the determined optimal content display factors to the content-providing remote server device 350 so that customized collections of third-party content are generated for the mobile computing device 310. In another instance, the interaction-analyzing remote server device 360 of FIG. 3 can communicate the determined optimal content display factors to the third-party content optimization component 330, or components thereof, to facilitate the generation of customized requests for particularly relevant pieces or collections of third-party content for the mobile computing device 310. It is also contemplated that the determined optimal content display factors can be communicated between components of the mobile computing device 310 to facilitate the customization of third-party content in accordance with embodiments described herein.

Figure 7:
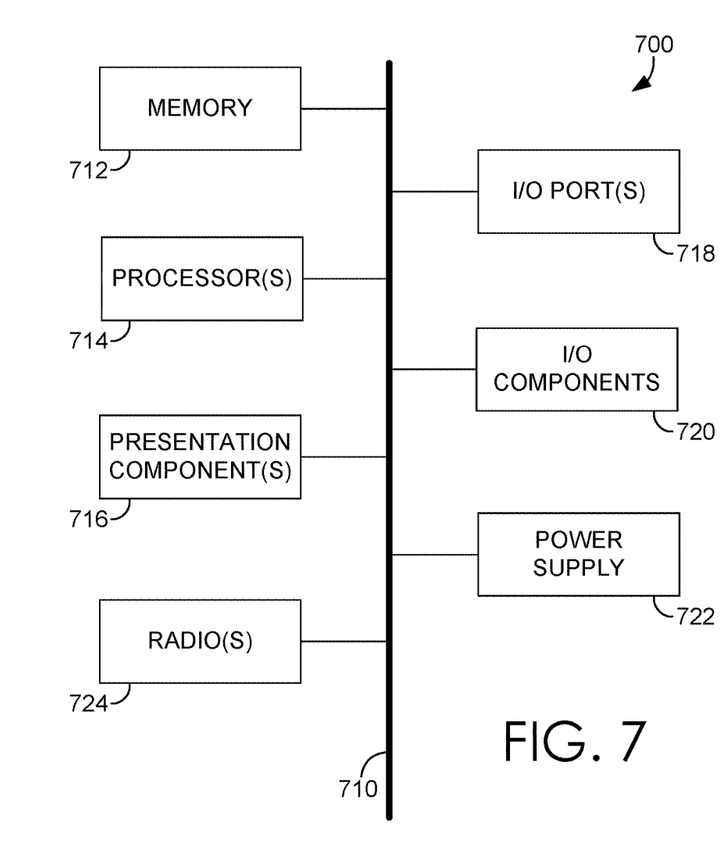
FIG. 7 is a block diagram of an exemplary computing environment suitable for use in implementations of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As described above, implementations of the present disclosure relate to techniques for optimizing content delivery within mobile applications. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
   communicating, to a remote server device, application interaction data that is generated based on at least one detected input corresponding to a mobile application, wherein the application interaction data comprises one or more screen orientations detected during operation of the mobile application, wherein the one or more screen orientations comprise a first screen orientation detected in association with a first user input detected during operation of the mobile application and a second screen orientation detected in association with a second user input detected during operation of the mobile application, wherein the first user input is different than the second user input;
   during a known down time, receiving, from the remote server device, a collection of content that includes a plurality of pieces of content that are each displayable within the mobile application in a display configuration determined by the remote server device based on the application interaction data including the one or more screen orientations comprising the first screen orientation and the second screen orientation, wherein the known down time is based on at least one of a typical user sleep time, a charging time or detection of no physical movement;
   determining that the mobile application is requesting a piece of content from the collection of content for display within a user interface of the mobile application; and
   providing, at a first time, the mobile application with a first piece of content selected from the collection of content for display in the display configuration and within the user interface of the mobile application based on the determination that the mobile application is requesting the piece of content, wherein the first time is based on a determination that a threshold duration has been at least one of met or exceeded.

2. The non-transitory computer storage medium of claim 1, wherein the collection of content is stored on a mobile computing device in a memory location that is not associated with the mobile application.

3. The non-transitory computer storage medium of claim 2, wherein the known down time is based on the detection of no physical movement of the mobile computing device.

4. The non-transitory computer storage medium of claim 1, wherein the known down time is based on the charging time.

5. The non-transitory computer storage medium of claim 1, wherein the known down time is based on the typical user sleep time.

6. The non-transitory computer storage medium of claim 1, wherein the receiving, the determining, and the providing are background processes that are separate from the mobile application.

7. A computer-implemented method for optimizing content configuration within mobile applications, the method comprising:
   during a known down time of a mobile computing device, obtaining, by the mobile computing device, application interaction data that is generated based on an application executing on the mobile computing device, wherein the application interaction data comprises one or more screen orientations detected during operation of the application, wherein the one or more screen orientations comprise a first screen orientation detected in association with a first user input detected during operation of the application and a second screen orientation detected in association with a second user input detected during operation of the application, wherein the first user input is different than the second user input;
   sending, by the mobile computing device, the application interaction data to a remote server device configured to determine content display factors for the mobile computing device based on the application interaction data sent thereto;

receiving, by the mobile computing device, the content display factors from the remote server device, wherein the content display factors define an orientation associated with the one or more screen orientations, comprising the first screen orientation and the second screen orientation, in the application interaction data; and providing, at a first time, for display, by the mobile computing device, at least one piece of content within a user interface of the application executing on the mobile computing device, wherein the at least one piece of content is provided for display within the user interface in a display configuration determined for the mobile computing device based on the content display factors, wherein the first time is based on a determination that a threshold duration has been at least one of met or exceeded.

8. The method of claim 7, wherein the known down time is based on at least one of a typical user sleep time, a charging time or detection of no physical movement.

9. The method of claim 7, the application interaction data being based on at least one of a duration of use, a frequency of use, a time of use, or a location of use, each corresponding to the application executing on the mobile computing device.

10. The method of claim 7, wherein the content display factors define at least one of a time, a duration, a position, or a size to provide for display the at least one piece of content within the user interface of the application executing on the mobile computing device.

11. The method of claim 7, further comprising:
obtaining, by the mobile computing device, the at least one piece of content from a collection of content that is stored on the mobile computing device.

12. The method of claim 11, wherein the collection of content is obtained from at least one of the remote server device or another remote server device.

13. The method of claim 7, wherein the application interaction data is collected by a portion of code associated with the application executing on the mobile computing device and based on a third-party content software development kit (SDK).

14. A computerized system comprising:
one or more processors; and
one or more computer storage media storing computer-usable instructions that, when used by the one or more processors, cause the one or more processors to:
receive application interaction data from a remote mobile computing device, wherein the application interaction data is generated by the remote mobile computing device based on at least one detected input that corresponds to an application of the remote mobile computing device, wherein the application interaction data comprises one or more screen orientations detected during operation of the application on the remote mobile computing device, wherein the one or more screen orientations comprise a first screen orientation detected in association with a first user input detected during operation of the application and a second screen orientation detected in association with a second user input detected during operation of the application, wherein the first user input is different than the second user input;
determine content display factors for the remote mobile computing device based on the application interaction data, wherein the content display factors define an orientation associated with the one or more screen orientations, comprising the first screen orientation and the second screen orientation, in the application interaction data; and
during a known down time of the remote mobile computing device, send the content display factors to the remote mobile computing device for storage thereon, wherein the remote mobile computing device is configured to display, at a first time, at least one piece of content within a user interface of the application and in a display configuration determined by the remote mobile computing device based on the content display factors sent thereto, wherein the first time is based on a determination that a threshold duration has been at least one of met or exceeded.

15. The computerized system of claim 14, wherein the instructions cause the one or more processors to:
process the application interaction data to determine a time to provide at least some content for display on the remote mobile computing device, wherein the sending comprises sending a first content display factor indicative of the time.

16. The computerized system of claim 14, wherein the instructions cause the one or more processors to:
process the application interaction data to determine the orientation to provide at least some content for display on the remote mobile computing device, wherein the sending comprises sending a first content display factor indicative of the orientation.

17. The computerized system of claim 14, wherein the instructions cause the one or more processors to:
process the application interaction data to determine a duration to provide at least some content for display on the remote mobile computing device, wherein the sending comprises sending a first content display factor indicative of the duration.

18. The computerized system of claim 14, wherein the instructions cause the one or more processors to:
process the application interaction data to determine a position within the user interface to provide at least some content for display on the remote mobile computing device, wherein the sending comprises sending a first content display factor indicative of the position within the user interface.

19. The computerized system of claim 14, wherein the instructions cause the one or more processors to:
process the application interaction data to determine a size to provide at least some content for display on the remote mobile computing device, wherein the sending comprises sending a first content display factor indicative of the size.

20. The computerized system of claim 14, wherein the known down time is based on at least one of a typical user sleep time or charging of the remote mobile computing device associated with the application.

* * * * *